Patented Mar. 6, 1951

2,544,351

UNITED STATES PATENT OFFICE 2,544,351

PROCESS FOR PREPARING THERMOSETTING UREA-FORMALDEHYDE COMPOSITIONS

Charles H. Parker, Jr., Stamford, Conn., assignor to American Cyanamid Company, New York, N. Y., a corporation of Maine No Drawing. Application November 8, 1946, Serial No. 708,807

7 Claims. (Cl. 260—70)

This invention relates to a process of preparing thermosetting alkylated urea-formaldehyde resins, and it is particularly directed to an economical process for butylating methylol-urea intermediates.

According to the preferred process of this invention, a suitable substantially dry intermediate, such as dimethylol urea, and preferably dimethylol urea of approximately 22% nitrogen content is dispersed in a mixture of a relatively small amount of a 37% formaldehyde solution and from $\frac{1}{10}$ to 1 mol of normal butanol per mol of active dimethylol urea, by indirect heating accompanied by agitation. In practicing the invention, it is preferable to use the lower amount of alcohol because complete dispersion is more quickly obtained. When complete homogeneity is obtained, additional butanol is added, if necessary, to make the total content 1 mol of butanol per mol of active dimethylol urea. A suitable alkylating catalyst, such as phosphoric acid, is added, and a pronounced exothermic reaction results. When this reaction has completely spent itself, a crystal clear solution results. Sufficient primary butyl alcohol to bring the total content to 68.4–90% of the theoretical amount required to produce the full ether is then added, and the whole refluxed for about one to four hours. The resin solution may then be dehydrated by any of the usual methods.

There are several variables in the process which may be adjusted to control the viscosity of the final product. For example, the amount of butanol added, after the exothermic action ceases, controls the viscosity inversely to the amount of butanol, i. e., a lesser quantity of butanol will produce a higher final viscosity. The quantity of acid catalyst that is employed controls the viscosity directly; the larger the quantity of acid, the higher the viscosity. The amount of formaldehyde employed in the initial reaction controls the viscosity inversely; when more formaldehyde is used, a lower viscosity results for the same butanol content, than when a lesser quantity of formaldehyde is employed. The amount of formaldehyde which may be used should be between 0.22–0.45 mol per mol of dimethylol urea. A very high viscosity can be obtained by replacing formaldehyde with water at the sacrifice of quality in the initial dispersion. The length of reflux time is also a variable factor controlling the viscosity of the final product. The longer the reflux time of the monoether stage while in the presence of acid, the higher is the degree of polymerization of the unalkylated portion of the resin. This bodying action is very rapid and difficult to control; thus, it is the most unsatisfactory means for developing high final viscosity. The length of reflux time after all of the butanol has been added, however, has little bearing on the final viscosity, and serves primarily to assure that alkylation with this amount is as nearly complete as possible; usually one hour is sufficient.

As specific forms of methylol ureas which were alkylated and dehydrated by this process to give excellent results, the following examples are given by way of illustration.

Intermediate I

This intermediate was a dry dimethylol urea obtained by E. I. DuPont. It was a crystalline product of coarse particle size, and containing 88%–92% active dimethylol urea.

Intermediate II

This intermediate was obtained by spray drying an aqueous syrup, containing about 2.2 mols of formaldehyde per mol of urea, prepared by heating the urea-formaldehyde mixture under a pH of 4–5 to effect reaction and thereafter rendering the syrup alkaline.

Intermediate III

This intermediate was prepared by heating to reflux an aqueous mixture comprising approximately 2.1–2.3 mols of formaldehyde per mol of urea at a pH of 7.5–8.5 and vacuum concentrating until approximately 75%–85% of the water initially present had been removed.

In order to more fully illustrate the invention, the following examples are given:

Example 1

To a suitable reaction vessel fitted with means for indirect heating, an agitator, particularly of the turbine or anchor type, a reflux condensor, and a water trap of the decantor or separator type, there were charged 138 parts of dry dimethylol urea of 21.9% nitrogen content, 40 parts of a 37% formaldehyde solution, and 11 parts of normal butanol. This mixture was heated slowly to reflux under constant agitation, and held under reflux conditions until all of the dimethylol urea had dissolved, yielding a homogeneous, but not necessarily perfectly clear product. 63 parts of normal butanol were then added, followed immediately by the addition of 0.45 parts of 85% phosphoric acid. A very strong exothermic reaction developed instantly, raising the batch to reflux heat. After approximately a minute, or slightly longer at heat, a crystal clear solution resulted. The exothermic heat was maintained for approximately 5-10 minutes. As soon as the reaction had spent itself and reflux stopped, 36 parts of normal butanol were added and the solution refluxed for one hour. 48 parts of xylene were then slowly fed into the reaction mass with the column set for decantation and return of the butanol rich upper layer to the reactor. The rate of flow of xylene was approximately equal to the volume of lower layer building up in the separator. This decantation, xylene feed, and reflux return was maintained until approximately 55 parts by weight of lower layer had been recovered from the separator. The xylene feed rate was increased at this point, so that the remainder of the 48 parts was introduced into the reaction mass by the time 60 parts of the lower layer had been recovered from the separator. Decantation, with continuous return of the upper layer to the reactor, was continued until a sample of the reaction mass had a xylene dilution ratio of more than 100-1. When this dilution ratio had been obtained, approximately 75 parts of lower layer had been recovered from the separator. During this decantation, the batch temperature gradually increased from 90° C. to 120° C., which latter figure was taken as an appropriate end point. The product obtained in this manner had a viscosity of Z-Z$_1$ (Gardner-Holdt), 53% solids, infinite xylene tolerance, and an acid number of 1.6. The yield according to this process was 260 parts by weight of final product. Considering the 75 parts distillate which was mostly water, there was only 1.5 parts loss.

*Example 2*

Into a reaction vessel, as previously described in Example 1, there were charged 69 parts of dry dimethylol urea containing 21.9% nitrogen, 11 parts normal butanol, and 20 parts of a 37% formaldehyde solution. This mixture was heated to 85° C. and 69 more parts of the dry dimethylol urea were added thereto; the mixture was then heated to reflux and held until all of the dimethylol urea had dissolved. 63 parts of normal butanol and 0.45 part 85% phosphoric acid were added, and an exothermic reaction started immediately. After cessation of the exothermic reaction, 36 parts of normal butanol were added, and the mixture refluxed for one hour. 48 parts of xylene were fed into the reaction mixture with the column set for decantation; the rate of feed of the xylene being such that its flow approximately equalled the volume of lower layer formed in the separator. When about 20-25 parts of lower layer had been recovered from the separator, 11.25 parts of normal butanol was added to the reaction mixture to avoid colloidal swelling, which would make the distillation difficult. The distillation was continued with continuous feed of 48 parts xylene until approximately 50 parts of lower layer had been recovered in the separator. At about this point, all of the 48 parts of xylene had been added. Decantation was continued until the batch had a xylene tolerance greater than 100-1. When this had been accomplished, 62 parts by weight of lower layer had been obtained. 7.5 parts of xylene was then added. The product obtained in this manner had a viscosity of X+ (Gardner-Holdt), 46.8% solids, infinite xylene tolerance, and an acid number of 2.1. The yield according to this process was 271 parts by weight, and considering the 62 parts recovered as distillate, a loss of only 1.75 parts resulted.

*Example 3*

Into a suitable reaction vessel of the type previously described in Example 1, there were charged 69 parts of dry dimethylol urea, containing 21.9% nitrogen, 20 parts of 37% formaldehyde solution, and 11 parts of normal butanol. This mixture was heated to 85° C., and an additional 69 parts of dimethylol urea were added thereto. This mixture was heated to reflux, and held until homogeneity was obtained, 5 to 15 minutes usually being adequate. 63 parts of normal butanol were added, and followed immediately with 0.45 part of 85% phosphoric acid. An exothermic reaction developed instantly. After cessation of the exothermic reaction, 36 parts of normal butanol were added, and the mixture refluxed for approximately one hour. 2.5 parts of xylene was added all at once, and the mass distilled, using full forward flow distillation, gradually adding 64 parts normal butanol, and collecting the upper and lower layer distillates in separate receivers. When an amount of normal butanol equal to 64 parts of butanol gradually added had been recovered, 48 parts of xylene was gradually fed into the reaction mixture. When this amount of xylene was first started being added to the mixture, the distillation condensate was run over the separator, and the upper layer was returned to the batch while the lower layer was removed, and measured as fast as it formed. The xylene feed was continued until approximately 55 parts of the lower layer, including that removed under full forward distillation, had been recovered. At this point, all of the xylene had been added to the reaction batch. Decantation was continued with no further additions until the xylene tolerance of the batch was greater than 100-1. The total lower layer obtained from this process was 61 parts by weight. The product obtained in this manner had a viscosity of T(Gardner-Holdt), 49.4% solids, infinite xylene tolerance, and an acid number of 1.8. The yield obtained according to this process was 255 parts by weight of final product. Considering the 61 parts of lower layer and 64 parts butanol recovery, there was a loss of only 3 parts.

In prior art practices, it is sometimes taught that dry intermediates may be dispersed in a large excess of the dispersion media. This usually results in some insoluble materials, that is, gelled particles. The degree or quantity of insoluble material will vary with the degree of polymerization of the intermediate. By the process of this invention, no undispersed gel particles are encountered regardless of the state of polymerization or the particle size of the starting intermediate.

The invention is particularly useful in the production of thermo-setting butylated urea-formaldehyde resins by a substantially dry process, wherein complete dispersion of the dry intermediate is effected in the butylating medium. The resins obtained by this process have an extremely high tolerance for aromatic hydrocarbons, and can be produced in a range of viscosity from very low to very high, at will. The production rates over resins according to the process of this invention, is increased approximately three-fold over previously known processes, and the resins obtained by the process have improved useful film properties such as excellent flow, gloss, and alkali resistance combined with a toughness not usual with resins of this type.

I claim:

1. A process for preparing butylated urea-formaldehyde resins comprising dispersing a substantially dry dimethylol urea in primary butyl alcohol and water, said alcohol being present in an amount varying between about 0.10 and 1 mol per mol of active dimethylol urea, agitating said dispersion while heating at reflux until a homogeneous solution is obtained, thereafter adding primary butyl alcohol to the homogeneous solution in an amount sufficient to bring the total content of primary butyl alcohol to 1 mol per mol of active dimethylol urea, effecting exothermic reaction by the addition of an acid catalyst thereto and permitting the resulting exothermic reaction to proceed to completion, then adding sufficient primary butyl alcohol to bring the total content to 68.4–90% of the theoretical quantity required to produce the full diether and refluxing for 1–4 hours and dehydrating the resin solution.

2. A process for preparing butylated urea-formaldehyde resins comprising mixing a substantially dry dimethylol urea, primary butyl alcohol and 0.22–0.45 mol of aqueous formaldehyde per mol of dimethylol urea, said butyl alcohol being present in amount between 0.10 and 1 mol per mol of active dimethylol urea, heating at reflux while agitating the mixture until a homogeneous solution is obtained, thereafter adding sufficient primary butyl alcohol to bring the total primary butyl alcohol content to 1 mol per mol of active dimethylol urea, effecting exothermic reaction by addition of an acid catalyst, adding, after the resulting exothermic reaction has ceased, sufficient primary butyl alcohol to bring the total content to 68.4–90% of the theoretical amount of primary butyl alcohol required to produce the full diether and refluxing from 1–4 hours and dehydrating the resin solution.

3. A process for preparing butylated urea-formaldehyde resins comprising mixing a substantially dry dimethylol urea and primary butyl alcohol with 0.22–0.45 mol of aqueous formaldehyde per mol of dimethylol urea, said butyl alcohol being present in an amount between 0.10 and 1 mol per mol of active dimethylol urea, heating at reflux while agitating the mixture until a homogeneous solution is obtained, thereafter adding sufficient primary butyl alcohol to bring the total primary butyl alcohol content to 1 mol per mol of active dimethylol urea, effecting exothermic reaction by the addition of an acid catalyst, adding, after the resulting exothermic reaction has ceased, sufficient primary butyl alcohol to bring the total content to 68.4–90% of the theoretical amount of primary butyl alcohol required to produce the full diether and refluxing from 1–4 hours and dehydrating the resulting resin solution under decantation conditions, wherein the organic layer is continuously returned to the reactor while the inorganic layer is removed from the reaction system, while continuously feeding an organic solvent selected from the group consisting of xylene and primary butyl alcohol to the reaction mass.

4. A process for preparing butylated urea-formaldehyde resins comprising heating at reflux, while agitating, substantially dry dimethylol urea, 0.22–0.45 mol of aqueous formaldehyde per mol of dimethylol urea, and primary butyl alcohol, present in an amount between 0.1 and 1 mol per mol of active dimethylol urea until a homogeneous dispersion is obtained, adding sufficient primary butyl alcohol to bring the total primary butyl alcohol content to 1 mol per mol of active dimethylol urea, effecting exothermic reaction by adding an acid catalyst, adding at the completion of the resulting exothermic reaction sufficient primary butyl alcohol to bring the total content to 68.4–90% of the theoretical quantity of primary butyl alcohol needed to produce the full diether and refluxing for 1 hour, dehydrating the resulting solution by distillation under a feed of dry primary butyl alcohol followed by concentration by distillation of the excess primary butyl alcohol.

5. A process for preparing butylated urea-formaldehyde resins comprising mixing a substantially dry urea-formaldehyde intermediate with aqueous formaldehyde and primary butyl alcohol, wherein said formaldehyde is present in a mol ratio of 0.22–0.45 mol per mol of active urea-formaldehyde intermediate, and wherein said butyl alcohol is present in an amount between 0.10 and 1 mol per mol of active urea-formaldehyde intermediate, heating at reflux while agitating the mixture until a homogeneous solution is obtained, thereafter adding sufficient primary butyl alcohol to bring the total primary butyl alcohol content to 1 mol per mol of active urea-formaldehyde intermediate, effecting exothermic reaction by addition of an acid catalyst, adding, after the resulting exothermic reaction has ceased, sufficient primary butyl alcohol to bring the total content to 68.4–90% of the theoretical amount of primary butyl alcohol required to produce the full diether and refluxing from 1–4 hours, dehydrating the resin solution, while continuously adding xylene to the reaction mass.

6. A process for preparing butylated urea-formaldehyde resins comprising dispersing a substantially dry dimethylol urea in a mixture of aqueous formaldehyde and primary butyl alcohol, wherein said formaldehyde is present in a mol ratio of 0.22–0.45 mol per mol of dimethylol urea and said butyl alcohol is present in an amount between 0.10 and 1 mol per mol of active dimethylol urea, agitating while heating at reflux until a homogeneous solution is obtained, adding sufficient primary butyl alcohol so that the total content is 1 mol of primary butyl alcohol per mol of active dimethylol urea, effecting an exothermic reaction by adding an acid catalyst thereto and permitting the exothermic reaction to proceed to completion, adding primary butyl alcohol in an amount sufficient to bring the total primary butyl alcohol content to 68.4–90% of the theoretical quantity needed to produce the full diether, refluxing, and dehydrating the resulting resin solution under decantation, wherein the upper layer is returned to the reaction system while the lower layer is removed from the reaction, while continuously feeding xylene into the reaction mixture until said mixture has a xylene tolerance of at least 100–1.

7. A process for preparing butylated urea-formaldehyde resins comprising heating at reflux, while agitating, substantially dry dimethylol urea, aqueous formaldehyde and primary butyl alcohol, wherein said formaldehyde is present in a mol ratio of 0.22–0.45 mol of formaldehyde per mol of active dimethylol urea, and said primary butyl alcohol is present in an amount varying between 0.10 and 1 mol per mol of active dimethylol urea, until a homogeneous dispersion is obtained, adding sufficient primary butyl alcohol to bring the total content to 1 mol of primary butyl alcohol per mol of active dimethylol urea, adding immediately an acid catalyst to effect an exothermic reaction, permitting said reaction to proceed to completion, thereafter adding sufficient primary butyl alcohol to bring the total content to 68.4–90% of the theoretical quantity of primary butyl alcohol needed to produce the full diether, refluxing, and dehydrating under a constant feed of dry primary butyl alcohol followed by concentration of the resulting solution to remove excess primary butyl alcohol.

CHARLES H. PARKER, Jr.

REFERENCES CITED

The following references are of record in the file of this patent:

UNITED STATES PATENTS

| Number | Name | Date |
|---|---|---|
| 2,171,882 | Ludwig | Sept. 5, 1939 |
| 2,191,957 | Edgar et al. | Feb. 27, 1940 |
| 2,217,372 | Ludwig | Oct. 8, 1940 |
| 2,221,708 | Hodgins et al. | Nov. 12, 1940 |

FOREIGN PATENTS

| Number | Country | Date |
|---|---|---|
| 484,200 | Great Britain | Apr. 28, 1938 |